United States Patent
Nagao

(10) Patent No.: US 9,218,036 B2
(45) Date of Patent: Dec. 22, 2015

(54) POWER SUPPLY CONTROLLING APPARATUS, POWER SUPPLY CONTROLLING SYSTEM, AND NON-TRANSITORY COMPUTER READABLE RECORDING MEDIUM

(75) Inventor: Naoyuki Nagao, Shinagawa (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 812 days.

(21) Appl. No.: 12/929,534

(22) Filed: Jan. 31, 2011

(65) Prior Publication Data

US 2011/0188370 A1  Aug. 4, 2011

(51) Int. Cl.
| | |
|---|---|
| H04L 1/00 | (2006.01) |
| G06F 1/26 | (2006.01) |
| G06F 1/32 | (2006.01) |
| H04M 11/06 | (2006.01) |

(52) U.S. Cl.
CPC .............. *G06F 1/266* (2013.01); *G06F 1/3278* (2013.01); *H04M 11/066* (2013.01); *Y02B 60/126* (2013.01)

(58) Field of Classification Search
None
See application file for complete search history.

(56) References Cited

U.S. PATENT DOCUMENTS

| | | | |
|---|---|---|---|
| 7,263,636 B1 * | 8/2007 | Buller et al. | 714/47.2 |
| 2009/0234512 A1 * | 9/2009 | Ewing et al. | 700/295 |

FOREIGN PATENT DOCUMENTS

JP    2007-233596    9/2007

OTHER PUBLICATIONS

Patent Abstracts of Japan, Publication No. 2007-233596, Published Sep. 13, 2007.

* cited by examiner

*Primary Examiner* — Rhonda Murphy
(74) *Attorney, Agent, or Firm* — Staas & Halsey LLP

(57) ABSTRACT

A power supply controlling apparatus including: plural communication ports that connect to an information processing apparatus via plural communication devices, respectively; a switching portion that switches a setting of at least one of the communication ports so as to connect the at least one of the communication ports to any one of a data input and output device and one of the communication devices; and a transmission portion that, when the switching portion switches the setting of the at least one of the communication ports so as to connect the at least one of the communication ports to the one of the communication devices, and the communication devices are connected to the communication ports, respectively, transmits an e-mail in which an address of each of the communication ports has been described, to the information processing apparatus via the corresponding communication device connected to each of the communication ports.

15 Claims, 8 Drawing Sheets

POWER SUPPLY CONTROLLING APPARATUS, POWER SUPPLY CONTROLLING SYSTEM, AND NON-TRANSITORY COMPUTER READABLE RECORDING MEDIUM

CROSS-REFERENCE TO RELATED APPLICATION

This application is based upon and claims the benefit of priority of the prior Japanese Patent Application No. 2010-021637, filed on Feb. 2, 2010, the entire contents of which are incorporated herein by reference.

FIELD

A certain aspect of the embodiments discussed herein is related to a power supply controlling apparatus, a power supply controlling system, and a non-transitory computer readable recording medium.

BACKGROUND

Conventionally, there has been known a power supply controlling apparatus that communicates with an external device via an ISDN (Integrated Services Digital Network) line (See Japanese Laid-Open Patent Application No. 2007-233596). Further, there has been known a power supply controlling apparatus that includes two serial console ports as illustrated in FIG. 1. FIG. 1 illustrates the configuration of a part of a power supply controlling apparatus.

In FIG. 1, a power supply controlling apparatus 200 includes: a CPU (Central Processing Unit) 201 that controls the whole power supply controlling apparatus; an OS (Operating System) 202 that the CPU 201 activates; a serial console port 203; and a LAN (Local Area Network) connection port 204. The serial console port 203 is a serial console of the OS 202 (e.g. Linux) that operates in the power supply controlling apparatus 200, and connected to an input and output device 205 such as a keyboard and a mouse. The LAN connection port 204 constitutes an Ethernet port for example, and is connected to an external device 206 via a network such as a LAN.

Incidentally, when a modem 207 is connected to the serial console port 203 as illustrated in FIG. 1, and an external device 208 communicates with the power supply controlling apparatus 200 via the modem 207, an IP (Internet Protocol) address corresponding to a connection route of a network 209 and the modem 207 is required for the external device 208. When the connection procedure of the modem 207 and the network 209 is completed, the IP address is decided. Therefore, the external device 208 needs to confirm the IP address beforehand. However, the serial console port 203 is blocked with the modem 207, and hence the external device 208 cannot confirm the IP address. As a result, the power supply controlling apparatus 200 cannot secure a communication route with the external device 208.

SUMMARY

According to an aspect of the present invention, there is provided a power supply controlling apparatus including: a plurality of communication ports that connect to an information processing apparatus via a plurality of communication devices, respectively; a switching portion that switches a setting of at least one of the communication ports so as to connect the at least one of the communication ports to any one of a data input and output device and one of the communication devices; and a transmission portion that, when the switching portion switches the setting of the at least one of the communication ports so as to connect the at least one of the communication ports to the one of the communication devices, and the communication devices are connected to the communication ports, respectively, transmits an e-mail in which an address of each of the communication ports has been described, to the information processing apparatus via the corresponding communication device connected to each of the communication ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will now be given, with reference to the accompanying drawings, of an embodiment of the present invention.

Figure 2:
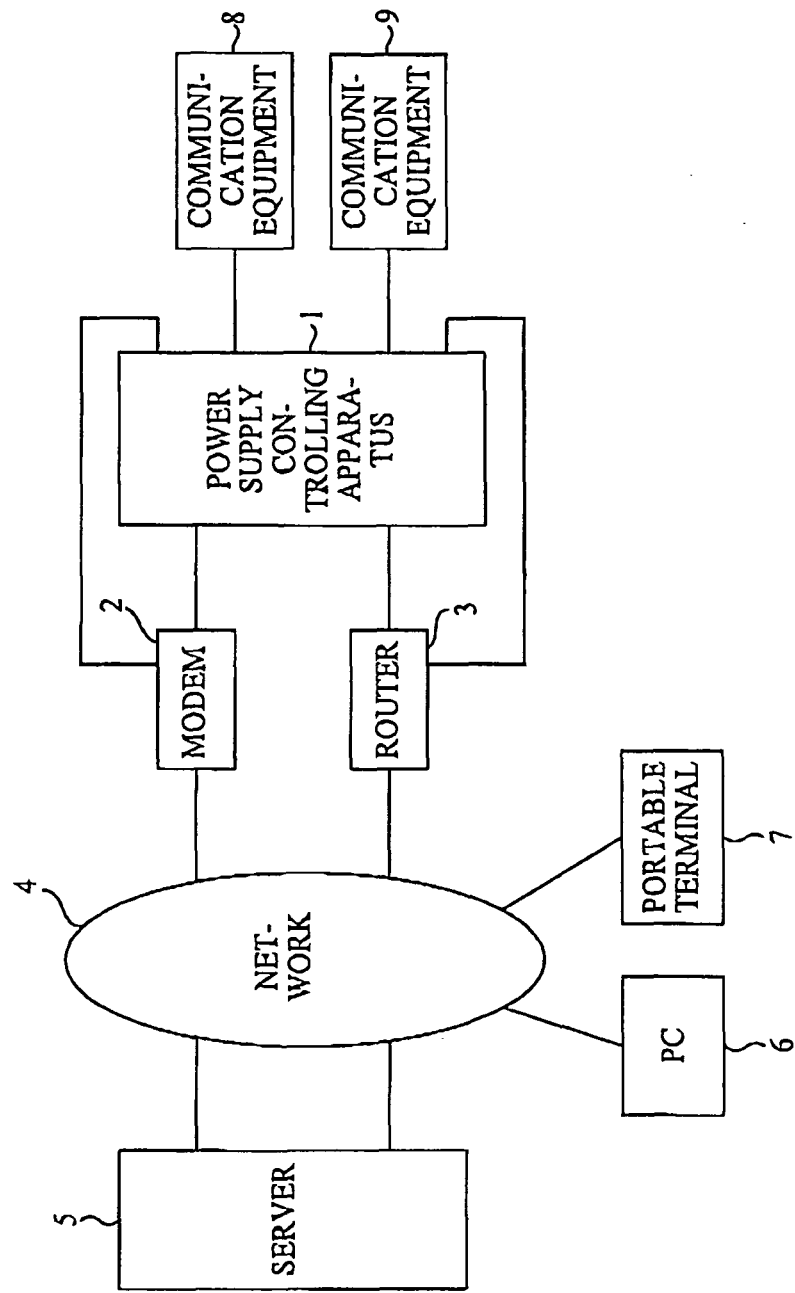
FIG. 2 is a schematic diagram illustrating the configuration of a system including a power supply controlling apparatus according to a first embodiment.

(First Embodiment) FIG. 2 is a schematic diagram illustrating the configuration of a system including a power supply controlling apparatus according to a first embodiment.

In FIG. 2, a power supply controlling apparatus 1 is connected to a modem 2 and a router 3 as communication apparatuses. The power supply controlling apparatus 1 is connected to communication equipment 8 and 9 such as MDFs (Main Distributing Frames). The modem 2 and the router 3 are connected to a server 5, a PC (Personal Computer) 6, and a portable terminal 7 via a network 4. The server 5, the PC 6, and the portable terminal 7 function as information processing apparatuses. The portable terminal 7 has a communication function such as a portable phone, and a PDA (Personal Digital Assistant). The modem 2 and the router 3 may be connected to the network through a communication line or wirelessly. The modem 2 may be an analog modem, or a modem for the portable terminal for connecting thereto the portable terminal 7. Since the modem 2 and the router 3 are the communication apparatuses for connecting thereto the server 5, the PC 6, and the portable terminal 7, the communication apparatuses are not limited to the modem 2 and the router 3. In this system, two modems or two routers may be connected to the power supply controlling apparatus 1. The server 5 includes a CPU (Central Processing Unit), a memory, a hard disk, and a network interface. Each of the server 5 and the PC 6 may be a server managing data, or a mail server.

The power supply controlling apparatus 1 supplies an power supply to the modem 2, the router 3, and the communication equipment 8 and 9. The power supply controlling apparatus 1 also controls on-off action of the power supplied to the modem 2, the router 3, and the communication equipment 8 and 9. Further, the power supply controlling apparatus 1 communicates with the server 5, the PC 6, and the portable terminal 7 via at least one of the modem 2 and the router 3. For example, the power supply controlling apparatus 1 transmits an e-mail to at least one of the PC 6 and the portable terminal 7 via the modem 2, and receives a response mail from the at least one of the PC 6 and the portable terminal 7 via the modem 2. Similarly, the power supply controlling apparatus 1 transmits an e-mail to at least one of the PC 6 and the portable terminal 7 via the router 3, and receives a response mail from the at least one of the PC 6 and the portable terminal 7 via the router 3. Also, the power supply controlling apparatus 1 receives from the PC 6 or the portable terminal 7 control information concerning the on-off action of the power supply supplied to the at least one of the modern 2 and the router 3, and turns on/off the at least one of the modem 2 and the router 3 based on the control information. Similarly, the power supply controlling apparatus 1 receives from the PC 6 or the portable terminal 7 control information concerning the on-off action of the power supply supplied to the at least one of the communication equipment 8 and 9, and turns on/off the at least one of the communication equipment 8 and 9 based on the control information. The communication equipment 8 and 9 may be devices having a need for reboot, and are not limited to the MDFs.

Figure 3:
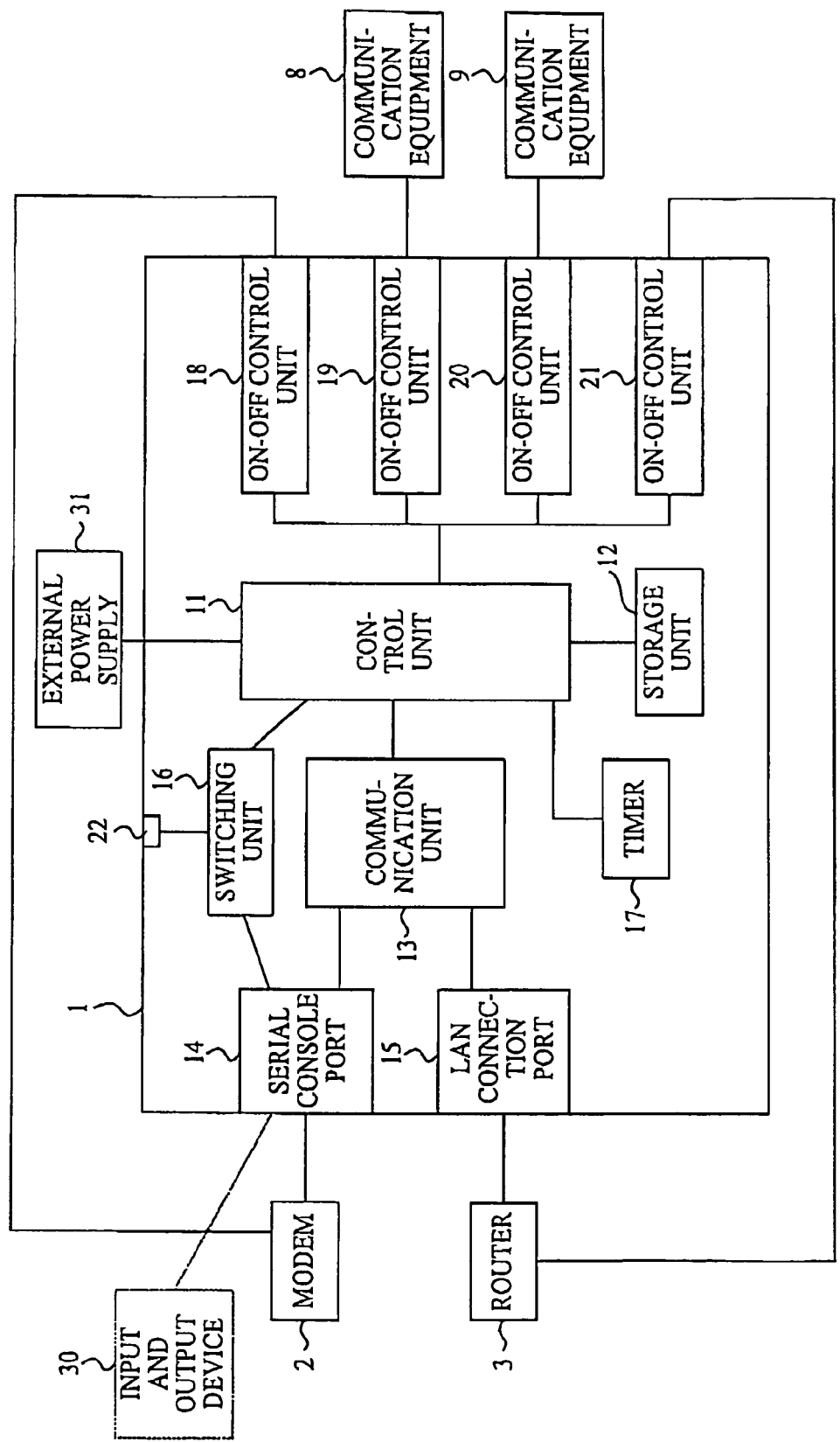
FIG. 3 is a block diagram illustrating the configuration of a power supply controlling apparatus 1.

FIG. 3 is a block diagram illustrating the configuration of the power supply controlling apparatus 1.

The power supply controlling apparatus 1 includes: a control unit 11 (a transmission portion, a judgment portion, and a notification portion) that controls the whole apparatus; a storage unit 12 that stores various data, table data, and the like; a communication unit 13 that communicates with the server 5, the PC 6, and the portable terminal 7 via at least one of the modem 2 and the router 3; a serial console port 14 (a communication port) that connects the power supply controlling apparatus 1 to the modem 2; a LAN connection port 15 (a communication port) that connects the power supply controlling apparatus 1 to the router 3; a switching unit 16 (a switching portion) that switches a device to be connected to the serial console port 14, to any one of the modem 2 and an input and output device 30. Further, the power supply controlling apparatus 1 includes: a timer 17 that counts up current time; and on-off control units 18 to 21 (reboot portion) that control the on-off action of the power supply (i.e., a current, a voltage, or an electric power) supplied to the modem 2, the router 3, and the communication equipment 8 and 9. An external power supply 31 is connected to the control unit 11. The external power supply 31 supplies the electric power to the modem 2, the router 3, and the communication equipment 8 and 9 via the control unit 11 and the on-off control units 18 to 21, and further supplies the electric power to each element in the power supply controlling apparatus 1.

Figure 4:
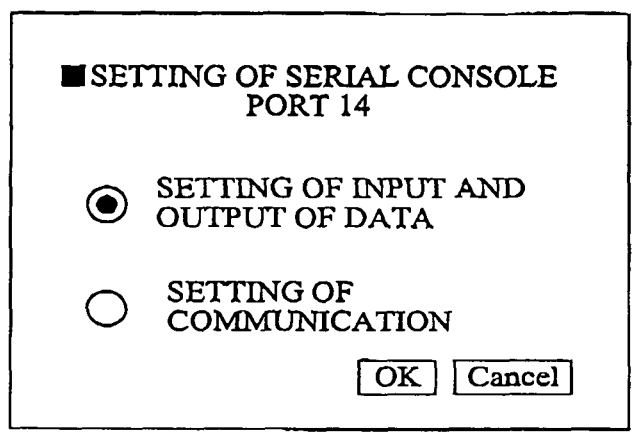
FIG. 4 is a diagram illustrating an example of a user interface.

The input and output device 30 is at least one of a keyboard, a mouse, a monitor, and the like. The switching unit 16 switches the setting of the serial console port 14 according to an input from a user. In this case, the user can manually switch the setting of the serial console port 14 with a switch 22. A user interface for switching the setting of the serial console port 14 stored into the storage unit 12 as illustrated in FIG. 4 is read on the input and output device 30, the PC 6, or the portable terminal 7, and the user may specify the setting of the serial console port 14 on the user interface. Thereby, the switching unit 16 switches the setting of the serial console port 14 to the setting specified by the user.

Also, the switching unit 16 may receive information of the device (e.g. the modem 2, the router 3, the input and output device 30, or the like) connected to the serial console port 14, and automatically switch the setting of the serial console port 14 based on the received information, as in a plug and play function.

The setting of the serial console port 14 includes setting of input and output of data, and setting of communication. Specifically, when the input and output device 30 is connected to the serial console port 14, the setting of the serial console port 14 is setting for inputting and outputting data between the input and output device 30 and the communication unit 13 (i.e., the setting of input and output of data). When the input and output device 30 changes the setting of the power supply controlling apparatus 1, or the user confirms a communication log for example, the setting of input and output of data is used. When the modem 2 is connected to the serial console port 14, the setting of the serial console port 14 is setting in which the control unit 11 transmits an e-mail in which an IP address of the serial console port 14 has been described, to at least one of the PC6 and the portable terminal 7 via the modem 2, and receives a response mail from the at least one of the PC6 and the portable terminal 7 via the modem 2 (i.e., the setting of communication).

Thus, the switching unit 16 switches the setting of the serial console port 14 to the setting of input and output of data or the setting of communication, so that the power supply controlling apparatus 1 can switchably retain an input and output function of data and a communication function to the PC 6 or the portable terminal 7.

Although the input and output function of data and the communication function are switched in FIG. 3, the LAN connection port 15 may be configured such that the input and output function of data and the communication function are switchable. In this case, another switching unit is provided between the LAN connection port 15 and the control unit 11.

Figure 1:
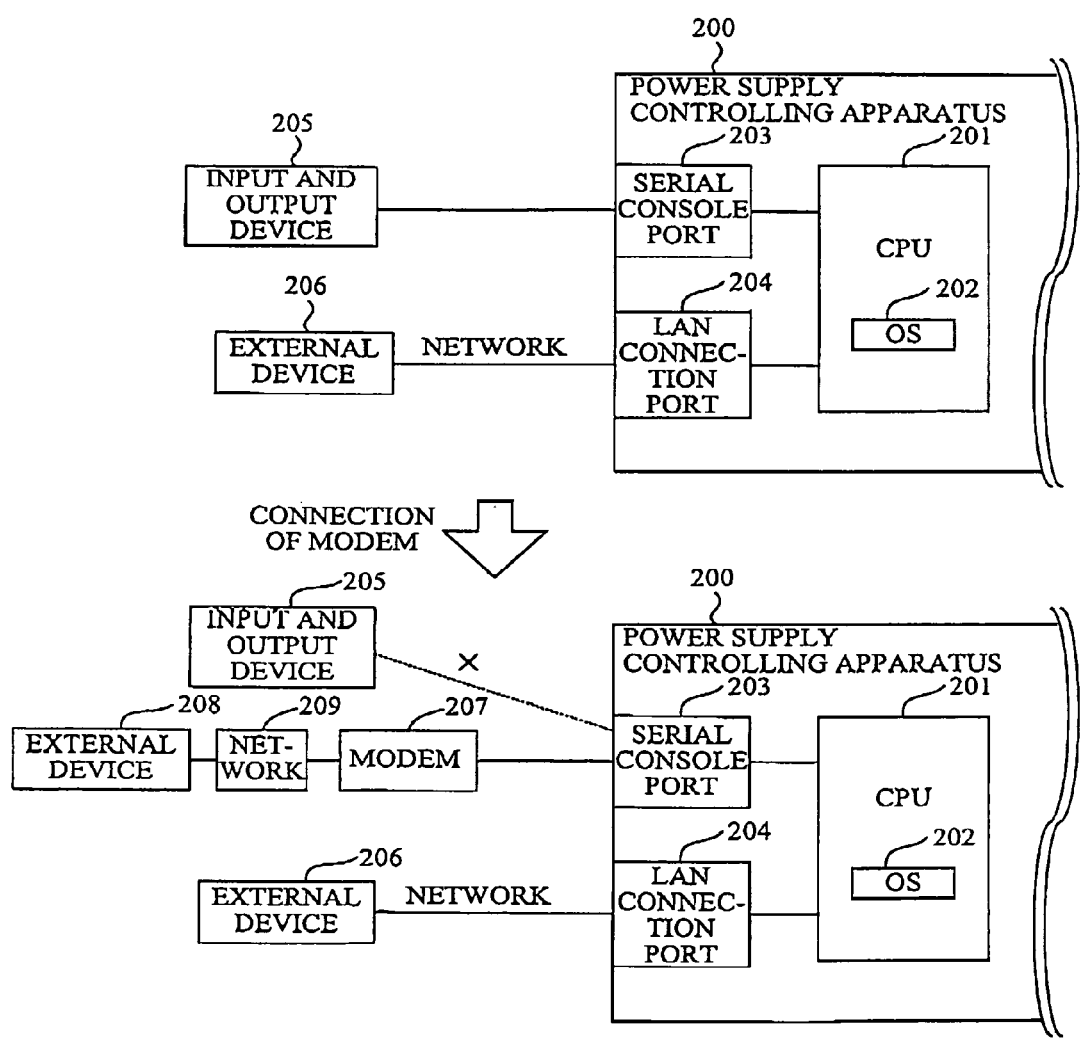
FIG. 1 is a block diagram illustrating the configuration of a part of a power supply controlling apparatus.
Figure 5:
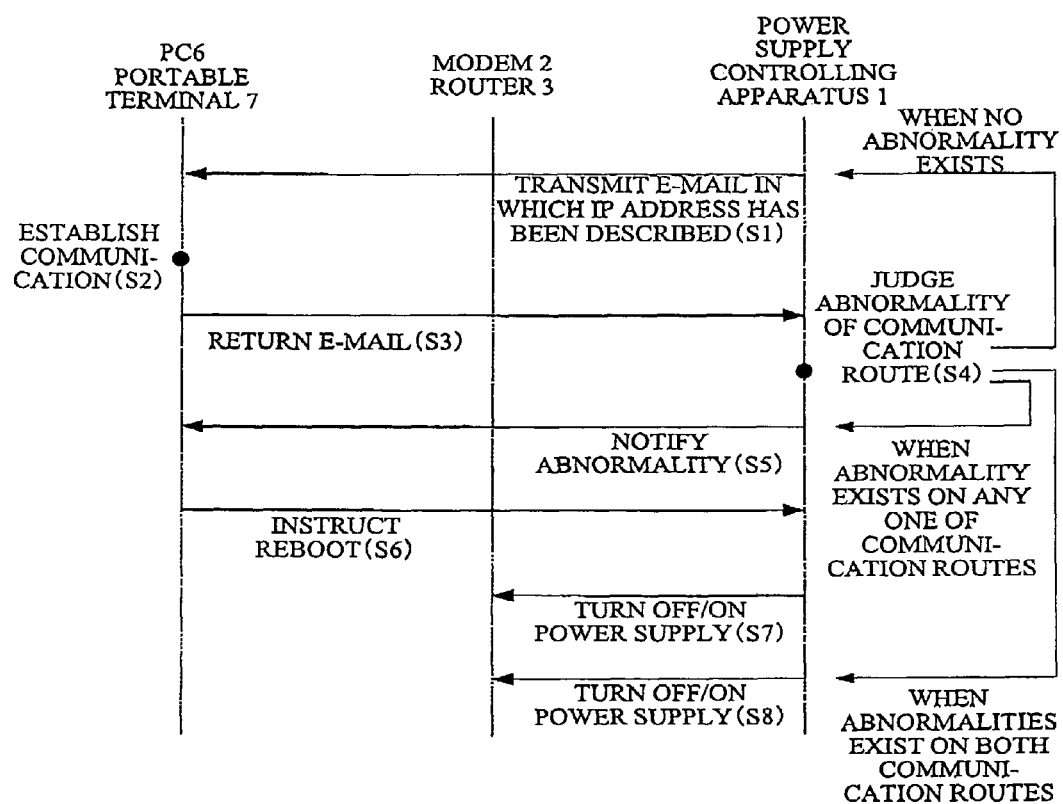
FIG. 5 is a diagram illustrating a process sequence of the system of FIG. 1.

FIG. 5 is a diagram illustrating a process sequence of the system of FIG. 1. It is assumed that the switching unit 16 switches the setting of the serial console port 14 to the setting of communication, and the modem 2 is connected to the serial console port 14.

Whenever the IP address of the serial console port 14 or the LAN connection port 15 is decided or changed, the control unit 11 of the power supply controlling apparatus 1 transmits an e-mail in which the EP address has been described, to at least one of the PC 6 and the portable terminal 7 (step S1). Thus, the IP address in which connection from the outside is enabled is described in the e-mail, and hence the at least one of the PC 6 and the portable terminal 7 can confirm the IP address of the serial console port 14 or the LAN connection port 15 even though the modem 2 or the router 3 is connected to the power supply controlling apparatus 1. Whenever the IP address of the serial console port 14 or the LAN connection port 15 is decided or changed, the at least one of the serial console port 14 or the LAN connection port 15 can acquire the latest IP address of the serial console port 14 or the LAN connection port 15.

The e-mail addresses of the PC 6 and the portable terminal 7, and a template of the e-mail are stored into the storage unit 12 in advance. Therefore, whenever the IP address of the serial console port 14 or the LAN connection port 15 is decided or changed, the control unit 11 pastes the decided or changed IP address in the template, and sets at least one address of the PC 6 or the portable terminal 7 as a destination address to make the e-mail. Then, the control unit 11 transmits the e-mail to the at least one of the PC 6 or the portable terminal 7.

Although the control unit 11 transmits the e-mail in which the EP address has been described, to the at least one of the PC 6 or the portable terminal 7 whenever the IP address of the serial console port 14 or the LAN connection port 15 is decided or changed, the control unit 11 may transmit the e-mail in which the IP address of the serial console port 14 or the LAN connection port 15 has been described, to the at least one of the PC 6 or the portable terminal 7 at regular intervals. Thereby, the at least one of the PC 6 or the portable terminal 7 can acquire the latest IP address at regular intervals.

The at least one of the PC 6 or the portable terminal 7 receives the e-mail in which the IP address has been described, and establishes the communication with the serial console port 14 and the LAN connection port 15 (step S2). The at least one of the PC 6 or the portable terminal 7 returns the e-mail to the power supply controlling apparatus 1 (step S3). The control unit 11 of the power supply controlling apparatus 1 judges whether there is an abnormality of the communication route based on the returned e-mail (step S4). In the system, there are a communication route (hereinafter referred to as "a communication route of the modem 2") in which the power supply controlling apparatus 1 connects with the at least one of the PC 6 or the portable terminal 7 via the serial console port 14 and the modem 2, and a communication route (hereinafter referred to as "a communication route of the router 3") in which the power supply controlling apparatus 1 connects with the at least one of the PC 6 or the portable terminal 7 via the LAN connection port 15 and the router 3. Also, the IP address of the serial console port 14 or the LAN connection port 15 is described in the e-mail transmitted to the at least one of the PC 6 or the portable terminal 7, and the e-mail is returned from the at least one of the PC 6 or the portable terminal 7. Therefore, the control unit 11 can judge through which communication route of the modem 2 or the router 3 the returned e-mail has reached the power supply controlling apparatus 1, by retrieving the body text of the returned e-mail. That is to say, the control unit 11 can judge that there is an abnormality on the communication route where the E-mail has not reached the power supply controlling apparatus 1, by retrieving the body text of the returned e-mail.

When there is the abnormality on the communication route of the modem 2 or the router 3, the control unit 11 notifies the at least one of the PC 6 or the portable terminal 7 of information on the communication route with the abnormality (step S5). Specifically, the control unit 11 transmits an e-mail indicative of the information on the communication route with the abnormality to the at least one of the PC 6 or the portable terminal 7.

The at least one of the PC 6 or the portable terminal 7 instructs the control unit 11 to reboot the modem 2 or the router 3 provided on the communication route with the abnormality (step S6). The control unit 11 causes the on-off control unit 18 or 21 to turn on and off the electric power to be supplied to the modem 2 or the router 3, according to the instruction from the at least one of the PC 6 or the portable terminal 7 (step S7). Thereby, the modem 2 or the router 3 reboots, i.e., restores.

When there is not the abnormality on the communication route of the modem 2 or the router 3, the control unit 11 performs no processing. The procedure returns to step S1 again. When there are the abnormalities on both of the communication routes of the modem 2 and the router 3, the control unit 11 cannot notify the PC 6 and the portable terminal 7 of information on the communication routes with the abnormalities, so that the control unit 11 causes the on-off control units 18 and 21 to turn on and off the electric power to be supplied to the modem 2 and the router 3 (step S8). Thereby, the modem 2 and the router 3 reboot, i.e., restore.

When there is the abnormality on the communication route of the modem 2 or the router 3, the control unit 11 may cause the on-off control unit 18 or 21 to turn on and off the electric power to be supplied to the modem 2 or the router 3 without notifying the PC 6 and the portable terminal 7 of the abnormality on the communication route of the modem 2 or the router 3.

According to the present embodiment, the power supply controlling apparatus 1 includes: a plurality of communication ports (e.g. the serial console port 14 and the LAN connection port 15) that connect with at least one of the PC6 and the portable terminal 7 via the modem 2 and the router 3, respectively; the switching unit 16 that switches the setting of the serial console port 14 to connect the serial console port 14 to any one of the modem 2 and the input and output device 30; a control unit 11 that transmits the e-mail in which the IP address of the serial console port 14 has been described and the e-mail in which the IP address of the LAN connection port 15 has been described to the at least one of the PC 6 or the portable terminal 7 via the modem 2 and router 3, respectively when the switching unit 16 switches the setting of the serial console port 14 to connect the serial console port 14 to the modem 2, and the modem 2 and the router 3 are connected to the serial console port 14 and the LAN connection port 15, respectively.

Therefore, the input and output function of data and the communication function to the information processing apparatus can be switchably retained by the switching unit 16. Moreover, since the e-mail in which the IP address of the serial console port 14 has been described and the e-mail in which the IP address of the LAN connection port 15 has been described are transmitted to the at least one of the PC 6 or the portable terminal 7 via the modem 2 and router 3, respectively, the at least one of the PC 6 or the portable terminal 7 can communicate with the plurality of communication ports. Accordingly, the power supply controlling apparatus 1 can acquire a plurality of communication routes to the at least one of the PC 6 or the portable terminal 7.

The control unit 11 judges whether there are the abnormalities on the communication routes, based on whether the returned mail to the transmitted mail has been received from the at least one of the PC 6 or the portable terminal 7. When the control unit 11 judges that there is the abnormality on at least one of the communication routes, the on-off control units 18 and 21 reboot at least one of the modem 2 or the router 3 provided on the communication route with the abnormality. Therefore, when there is the abnormality on the communication route due to at least one of the modem 2 or the router 3, the communication route with the abnormality can be automatically restored.

Moreover, when the control unit 11 judges that there is the abnormality on any one of the communication routes, the control unit 11 notifies the at least one of the PC 6 or the portable terminal 7 of the communication route with the abnormality via a normal communication route, and the on-off control unit 18 or 21 reboots the modem 2 or the router 3 provided on the communication route with the abnormality, according to the instruction from the at least one of the PC 6 or the portable terminal 7. Therefore, the at least one of the PC 6 or the portable terminal 7 is notified of the abnormality on the communication route, and the communication route with the abnormality can be restored according to the instruction from the at least one of the PC 6 or the portable terminal 7.

(Variation example) Although the control unit 11 of the power supply controlling apparatus 1 judges the abnormality of the communication route in FIG. 5, the at least one of the PC 6 or the portable terminal 7 may judge the abnormality of the communication route. A description will now be given of an example of a case where the at least one of the PC 6 or the portable terminal 7 judges the abnormality of the communication route.

Figure 6:
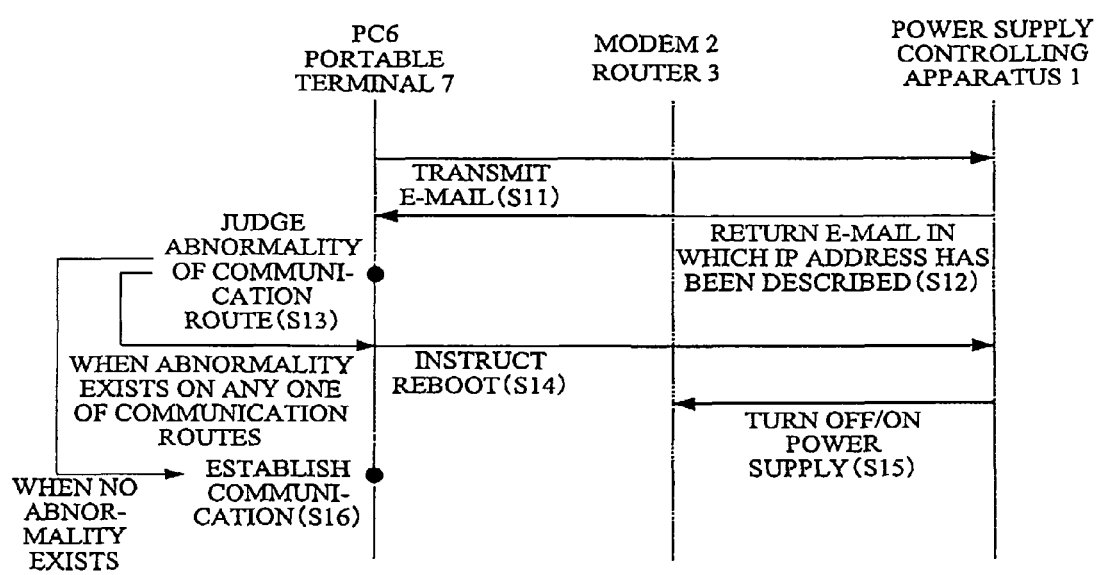
FIG. 6 is a diagram illustrating a process sequence of the system of FIG. 1.

FIG. 6 is a diagram illustrating a process sequence of the system of FIG. 1. It is assumed that the switching unit 16 switches the setting of the serial console port 14 to the setting of communication, and the modem 2 is connected to the serial console port 14.

First, the at least one of the PC 6 or the portable terminal 7 transmits an e-mail that requests the IP addresses of the serial console port 14 and the LAN connection port 15, to the power supply controlling apparatus 1 (step S11). It is assumed that the PC 6 and the portable terminal 7 store the e-mail address of the power supply controlling apparatus 1 in advance. Next, the control unit 11 of the power supply controlling apparatus 1 receives the e-mail, returns an e-mail in which the TP address of the serial console port 14 has been described, to the at least one of the PC 6 or the portable terminal 7 via the communication route of the modem 2, and returns an e-mail in which the IP address of the LAN connection port 15 has been described, to the at least one of the PC 6 or the portable terminal 7 via the communication route of the router 3 (step S12).

The at least one of the PC 6 or the portable terminal 7 judges whether there is an abnormality on the communication route, based on whether the e-mail has been received from the power supply controlling apparatus 1 (step S13). Specifically, when the at least one of the PC 6 or the portable terminal 7 cannot receive the e-mail in which the IP address of the serial console port 14 has been described, the at least one of the PC 6 or the portable terminal 7 judges that the communication route of the modem 2 is abnormal. When the at least one of the PC 6 or the portable terminal 7 cannot receive the e-mail in which the IP address of the LAN connection port 15 has been described, the at least one of the PC 6 or the portable terminal 7 judges that the communication route of the router 3 is abnormal. When the at least one of the PC 6 or the portable terminal 7 receives the e-mail in which the IP address of the serial console port 14 has been described, the at least one of the PC 6 or the portable terminal 7 judges that the communication route of the modem 2 is normal. When the at least one of the PC 6 or the portable terminal 7 receives the e-mail in which the IP address of the LAN connection port 15 has been described, the at least one of the PC 6 or the portable terminal 7 judges that the communication route of the router 3 is normal.

When there is the abnormality on the communication route of the modem 2 or the router 3, the at least one of the PC 6 or the portable terminal 7 instructs the control unit 11 to reboot the modem 2 or the router 3 provided on the communication route with the abnormality (step S14). The control unit 11 causes the on-off control unit 18 or 21 to turn on and off the electric power to be supplied to the modem 2 or the router 3, according to the instruction from the at least one of the PC 6 or the portable terminal 7 (step S15). Thereby, the modem 2 or the router 3 reboots, i.e., restores.

When there is not the abnormality on the communication route of the modem 2 or the router 3, the at least one of the PC 6 or the portable terminal 7 establishes the communication with the serial console port 14 and the LAN connection port 15 (step S16). When there are the abnormalities on both of the communication routes of the modem 2 and the router 3, the at least one of the PC 6 or the portable terminal 7 cannot communicate with the power supply controlling apparatus 1. Therefore, an operator works to directly restore the communication route of the modem 2 or the communication route of the router 3.

(Second Embodiment)
The power supply controlling apparatus 1 according to a second embodiment is different from the power supply controlling apparatus 1 according to the first embodiment in not including the switching unit 16, the serial console port 14 with the switching function, and the switch 22. The power supply controlling apparatus 1 according to the second embodiment is different from the power supply controlling apparatus 1 according to the first embodiment in connecting an expansion device 101.

A description will now be given, with reference to FIG. 7, of the second embodiment.

Figure 7:
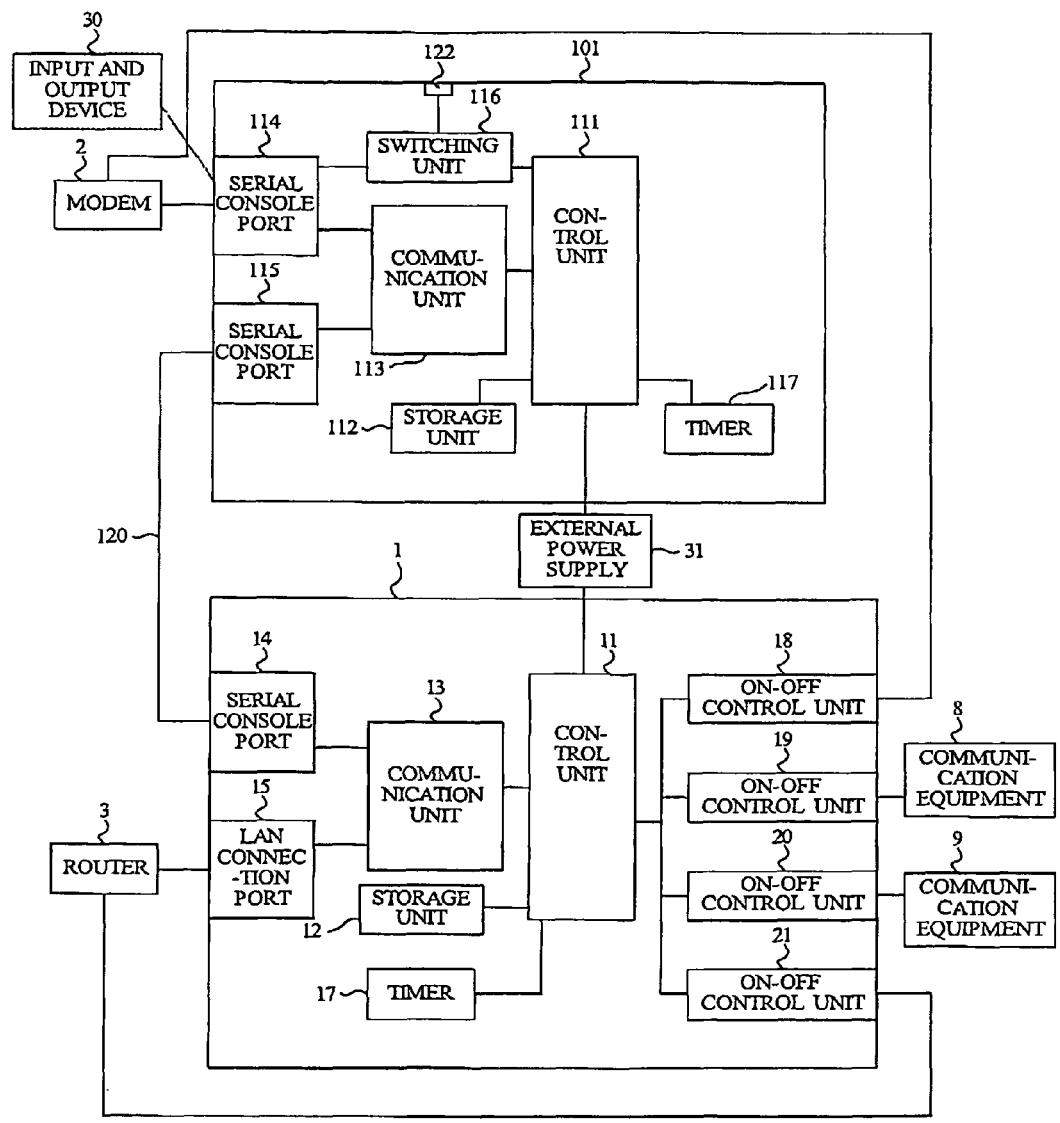
FIG. 7 is a block diagram illustrating the configurations of the power supply controlling apparatus 1 and an expansion device 101 according to a second embodiment.

FIG. 7 is a block diagram illustrating the configurations of the power supply controlling apparatus 1 and the expansion device 101 according to the second embodiment. The description concerning the configuration of the power supply controlling apparatus 1 according to the second embodiment which is the same as the configuration of the power supply controlling apparatus 1 according to the first embodiment is omitted.

The power supply controlling apparatus 1 and the expansion device 101 in FIG. 7 constitute a power supply controlling system. The expansion device 101 in FIG. 7 includes: a control unit 111 (a first transmission portion, a first judgment portion, a first notification portion) that controls the whole expansion device 101; a storage unit 112 that stores various programs, table data, and so on; a communication unit 113 that communicates with the server 5, the PC 6, and the portable terminal 7 via the modem 2; a serial console port 114 (a first communication port); a serial console port 115 (a second communication port); a switching unit 116 (a switch portion) that switches a device to be connected with the serial console port 114 to any one of the modem 2 and the input and output device 30; a timer 117 that counts up current time; and a switch 122 that instructs the switching unit 116 to switch the setting of the serial console port 114.

The serial console port 115 of the expansion device 101 is connected to the serial console port 14 (i.e., a third communication port) of the power supply controlling apparatus 1 via a serial cable or exclusive cable 120. The control unit 111 communicates with the control unit 11 (a second transmission portion, a second judgment portion, a second notification portion) via the serial cable or exclusive cable 120. An external power supply 31 is connected to the control units 11 and 111, and supplies the electric power to each of the elements of the power supply controlling apparatus 1 and the expansion device 101.

As in the switching unit 16, the switching unit 116 switches the setting of the serial console port 114 according to input from the user, i.e., the setting of the switch 122. Also, the switching unit 116 may switch the current setting of the serial console port 114 to the setting specified on the user interface of FIG. 4. Also, the switching unit 116 may receive information of the device connected to the serial console port 114, and automatically switch the setting of the serial console port 114 based on the received information, as in a plug and play function. As in the setting of the serial console port 14 of the first embodiment, the setting of the serial console port 114 includes setting of input and output of data, and setting of communication.

In the system according to the second embodiment, the power supply controlling apparatus 1 of FIG. 1 is replaced by the power supply controlling apparatus 1 and the expansion device 101 of FIG. 7.

Figure 8:
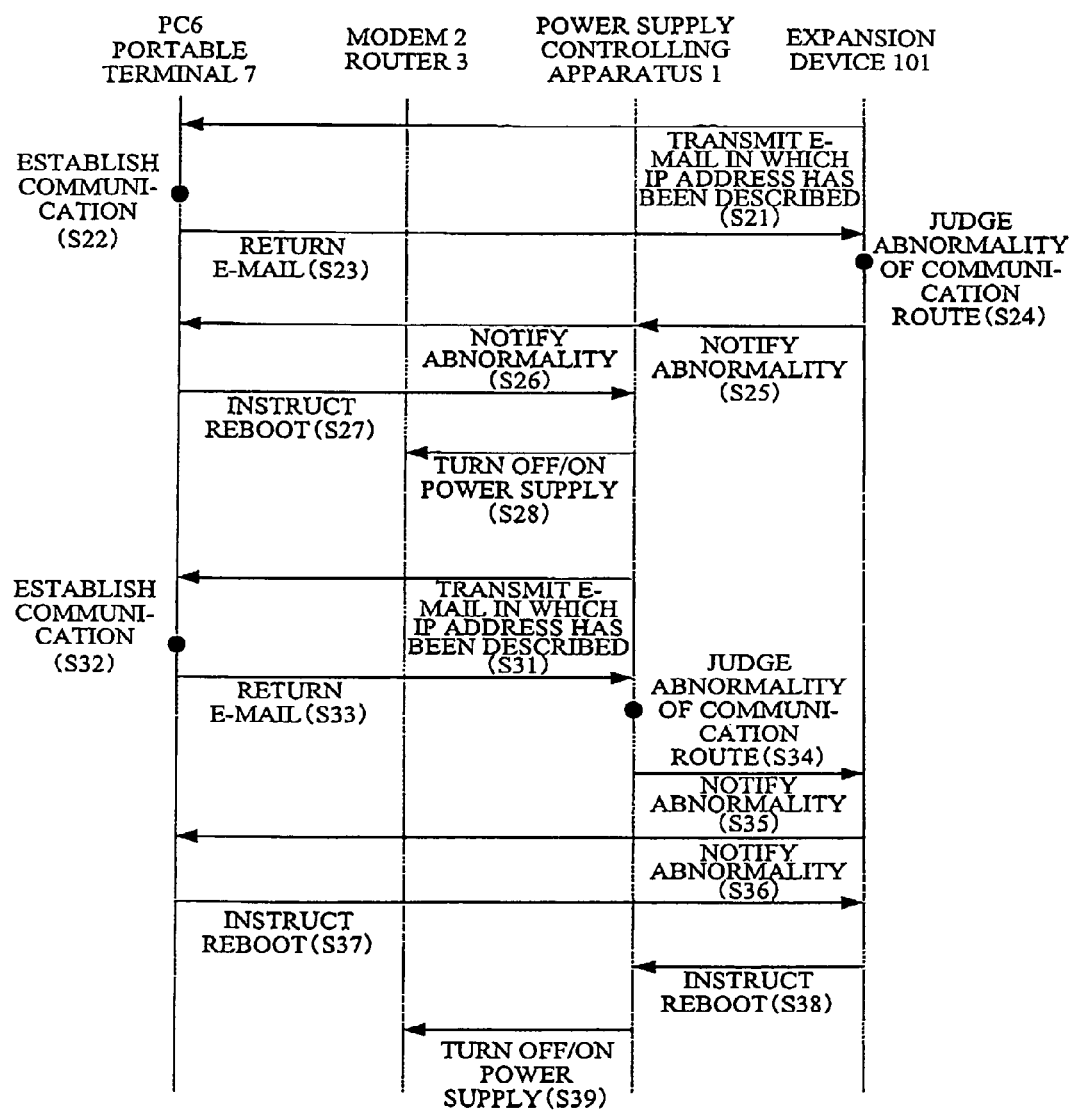
FIG. 8 is a diagram illustrating a process sequence of a system according to the second embodiment.

FIG. 8 is a diagram illustrating a process sequence of the system according to the second embodiment. It is assumed that the switching unit 116 switches the setting of the serial console port 114 to the setting of communication, the modem 2 is connected to the serial console port 114, and the router 3 is connected to the LAN connection port 15 (a fourth communication port).

First, whenever the IP address of the serial console port 114 is decided or changed, the control unit 111 of the expansion device 101 transmits an e-mail in which the IP address has been described, to at least one of the PC 6 and the portable terminal 7 (step S21). Thus, the IP address in which connection from the outside is enabled is described in the e-mail, and hence the at least one of the PC 6 and the portable terminal 7 can confirm the IP address of the serial console port 114 even though the modem 2 is connected to the power supply controlling apparatus 1. The e-mail addresses of the PC 6 and the portable terminal 7, and a template of the e-mail are stored into the storage unit 112 in advance. Therefore, whenever the IP address of the serial console port 114 is decided or changed, the control unit 111 pastes the decided or changed IP address in the template, and sets at least one address of the PC 6 or the portable terminal 7 as a destination address to make the e-mail. Then, the control unit 111 transmits the e-mail to the at least one of the PC 6 or the portable terminal 7.

Although the control unit 111 transmits the e-mail in which the IP address has been described, to the at least one of the PC 6 or the portable terminal 7 whenever the IP address of the serial console port 114 is decided or changed, the control unit 111 may transmit the e-mail in which the LP address of the serial console port 114 has been described, to the at least one of the PC 6 or the portable terminal 7 at regular intervals.

The at least one of the PC 6 or the portable terminal 7 receives the e-mail in which the IP address has been described, and establishes the communication with the serial console port 114 (step S22). The at least one of the PC 6 or the portable terminal 7 returns the e-mail to the expansion device 101 (step S23). The control unit 111 of the expansion device 101 judges whether there is an abnormality of the communication route (step S24). Specifically, the control unit 111 performs this judgment based on whether the control unit 111 has received the returned e-mail within a given time period from the transmission of the e-mail (e.g. 5 minutes). When the control unit 111 has received the returned e-mail within the given time period from the transmission of the e-mail (e.g. 5 minutes), the control unit 111 judges that the communication route of the modem 2 is normal. On the other hand, when the control unit 111 has not received the returned e-mail within the given time period from the transmission of the e-mail (e.g. 5 minutes), the control unit 111 judges that the communication route of the modem 2 is abnormal.

When there is the abnormality on the communication route of the modem 2, the control unit 111 notifies the control unit 11 of the power supply controlling apparatus 1 of information on the communication route with the abnormality (step S25). The control unit 11 of the power supply controlling apparatus 1 notifies the at least one of the PC 6 or the portable terminal 7 of the information on the communication route with the abnormality (step S26). Specifically, the control unit 11 transmits an e-mail indicative of the information on the communication route with the abnormality to the at least one of the PC 6 or the portable terminal 7.

The at least one of the PC 6 or the portable terminal 7 instructs the control unit 11 to reboot the modem 2 provided on the communication route with the abnormality (step S27). The control unit 11 causes the on-off control unit 18 to turn on and off the electric power to be supplied to the modem 2, according to the instruction from the at least one of the PC 6 or the portable terminal 7 (step S28). Thereby, the modem 2 reboots, i.e., restores.

When there is not the abnormality on the communication route of the modem 2, the control unit 111 performs no processing. The procedure returns to step S21 again. When the information on the communication route with the abnormality is notified from the control unit 111, the control unit 11 may cause the on-off control unit 18 to turn on and off the electric power to be supplied to the modem 2 without notifying the PC 6 and the portable terminal 7 of the abnormality on the communication route of the modem 2.

Next, whenever the IP address of the LAN connection port 15 is decided or changed, the control unit 11 of the power supply controlling apparatus 1 transmits an e-mail in which the IP address has been described, to at least one of the PC 6 and the portable terminal 7 (step S31). Thus, the IP address in which connection from the outside is enabled is described in the e-mail, and hence the at least one of the PC 6 and the portable terminal 7 can confirm the IP address of the LAN connection port 15 even though the router 3 is connected to the power supply controlling apparatus 1. The e-mail addresses of the PC 6 and the portable terminal 7, and a template of the e-mail are stored into the storage unit 12 in advance. Therefore, whenever the IP address of the LAN connection port 15 is decided or changed, the control unit 11 pastes the decided or changed IP address in the template, and sets at least one address of the PC 6 or the portable terminal 7 as a destination address to make the e-mail. Then, the control unit 11 transmits the e-mail to the at least one of the PC 6 or the portable terminal 7.

Although the control unit 11 transmits the e-mail in which the IP address has been described, to the at least one of the PC 6 or the portable terminal 7 whenever the JP address of the LAN connection port 15 is decided or changed, the control unit 11 may transmit the e-mail in which the IP address of the LAN connection port 15 has been described, to the at least one of the PC 6 or the portable terminal 7 at regular intervals.

The at least one of the PC 6 or the portable terminal 7 receives the e-mail in which the LP address has been described, and establishes the communication with the LAN connection port 15 (step S32). The at least one of the PC 6 or the portable terminal 7 returns the e-mail to the power supply controlling apparatus 1 (step S33). The control unit 11 of the power supply controlling apparatus 1 judges whether there is an abnormality of the communication route (step S34). Specifically, the control unit 11 performs this judgment based on whether the control unit 11 has received the returned e-mail within a given time period (e.g. 5 minutes) from the transmission of the e-mail. When the control unit 11 has received the returned e-mail within the given time period from the transmission of the e-mail, the control unit 11 judges that the communication route of the router 3 is normal. On the other hand, when the control unit 11 has not received the returned e-mail within the given time period from the transmission of the e-mail, the control unit 11 judges that the communication route of the router 3 is abnormal.

When there is the abnormality on the communication route of the router 3, the control unit 11 notifies the control unit 111 of the expansion device 101 of information on the communication route with the abnormality (step S35). The control unit 111 of the expansion device 101 notifies the at least one of the PC 6 or the portable terminal 7 of the information on the communication route with the abnormality (step S36). Specifically, the control unit 111 transmits an e-mail indicative of the information on the communication route with the abnormality to the at least one of the PC 6 or the portable terminal 7.

The at least one of the PC 6 or the portable terminal 7 instructs the control unit 11 to reboot the router 3 provided on the communication route with the abnormality (step S37). The control unit 111 notifies the control unit 11 of the power supply controlling apparatus 1 of an instruction on the reboot of the router 3 (step S38). The control unit 11 of the power supply controlling apparatus 1 causes the on-off control unit 21 to turn on and off the electric power to be supplied to the router 3, according to the instruction on the reboot of the router 3 (step S39). Thereby, the router 3 reboots, i.e., restores. When there is not the abnormality on the communication route of the router 3, the control unit 11 performs no processing. The procedure returns to step S31 again.

When it is judged that there is the abnormality on the communication route of the router 3, the control unit 11 may cause the on-off control unit 21 to turn on and off the electric power to be supplied to the router 3 without notifying the PC 6 and the portable terminal 7 of the abnormality on the communication route of the router 3.

A process sequence of steps S21 to S28 (i.e., the abnormality judgment of the communication route by the expansion device 101, recovery work of the modem 2, and the like) may be simultaneously performed in parallel with a process sequence of steps S31 to S39 (i.e., the abnormality judgment of the communication route by the power supply controlling apparatus 1, recovery work of the router 3, and the like). Thereby, the time required for the process sequences of the system is shortened.

In the process sequences of FIG. 8, when there is at least a single abnormality on the communication routes due to at least one of the modem 2 or the router 3, the communication route with the abnormality can be automatically restored. Further, the at least one of the PC 6 or the portable terminal 7 is notified of the abnormality on the communication route, and the communication route with the abnormality can be restored according to the instruction from the at least one of the PC 6 or the portable terminal 7.

According to the second embodiment, the input and output function of data and the communication function to at least one of the PC 6 or the portable terminal 7 can be switchably retained by the switching unit 116 of the expansion device 101. Moreover, since the e-mail in which the IP address of the serial console port 114 has been described and the e-mail in which the LP address of the LAN connection port 15 has been described are transmitted to the at least one of the PC 6 or the portable terminal 7 via the modem 2 and router 3, respectively, the at least one of the PC 6 or the portable terminal 7 can communicate with the plurality of communication ports. Accordingly, the system including the power supply controlling apparatus 1 and the expansion device 101 can acquire a plurality of communication routes to the at least one of the PC 6 or the portable terminal 7.

A non-transitory recording medium on which the software program for realizing the functions of the power supply controlling apparatus 1 is recorded may be supplied to the control unit 11, and the control unit 11 may read and execute the program recorded on the non-transitory recording medium. In this manner, the same effects as those of the first and the second embodiments can be achieved. The non-transitory recording medium for providing the program may be a CD-ROM (Compact Disk Read Memory), a DVD (Digital Versatile Disk), a SD (Secure Digital) card or the like, for example.

Alternatively, the control unit 11 may execute a software program for realizing the functions of the power supply controlling apparatus 1, so as to achieve the same effects as those of the above-described first and second embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A power supply controlling apparatus comprising:
   a plurality of communication ports, each of which is configured to be connected to an information processing apparatus via a different communication device, respectively, at least one of the communication ports also being configured to be connected to a data input and output device;
   a switching portion that switches a setting of at least one of the communication ports so as to connect the communication port to either one of the data input and output device and the corresponding communication device; and
   a transmission portion that, when the switching portion switches the setting of the communication port so as to connect the communication port to the corresponding communication device, and the communication devices are connected to the corresponding communication ports, respectively, transmits an e-mail in which an address of the communication port is described, to the information processing apparatus via at least one of the communication devices.

2. The power supply controlling apparatus according to claim 1, further comprising:
   a judgment portion that judges whether there are abnormalities on any of communication routes connected to the information processing apparatus via the corresponding communication device, based on whether a returned mail has been received from the information processing apparatus; and
   a reboot portion that, when the judgment portion judges that there is an abnormality on at least one of the communication routes, reboots the communication device provided on the communication route with the abnormality.

3. The power supply controlling apparatus according to claim 2, further comprising:
   a notification portion that, when the judgment portion judges that there is the abnormality on any of the communication routes, notifies the information processing apparatus of the communication route with the abnormality via a normal communication route;
   wherein the reboot portion reboots the communication device provided on the communication route with the abnormality according to an instruction from the information processing apparatus as a response of the notification by the notification portion.

4. The power supply controlling apparatus according to claim 1, wherein whenever the address of at least one of the communication ports is decided or changed, the transmission portion transmits the e-mail in which the decided or changed address of the communication port is described, to the information processing apparatus via the corresponding communication device connected to the communication port in which the address is decided or changed.

5. The power supply controlling apparatus according to claim 1, wherein the transmission portion transmits the e-mail in which the address of each of the communication ports is described, to the information processing apparatus via the corresponding communication device connected to the communication port at regular intervals.

6. The power supply controlling apparatus according to claim 1, wherein the switching portion switches the setting of the at least one of the communication ports according to an instruction from a user or receiving information on the communication device connected to the at least one of the communication ports.

7. The power supply controlling apparatus according to claim 1, wherein the transmission portion transmits the e-mail to the information processing apparatus via the communication device connected to the communication port in which the setting is switched.

8. A power supply controlling system that includes a power supply controlling apparatus and an expansion device, comprising:
the expansion device including:
a first communication port that is connectable to any one of a first communication device and a data input and output device;
a second communication port that is connectable to the power supply controlling apparatus;
a switching portion that switches a setting of the first communication port so as to connect the first communication port to any one of the first communication device and the data input and output device; and
a first transmission portion that, when the switching portion switches the setting of the first communication port so as to connect the first communication port to the first communication device, and the first communication port is connected to the first communication device, transmits an e-mail in which an address of the first communication port is described, to an information processing apparatus via the first communication device; and
the power supply controlling apparatus including:
a third communication port that is connectable to the expansion device;
a fourth communication port that is connectable to a second communication device; and
a second transmission portion that, when the fourth communication port is connected to the second communication device, transmits an e-mail in which an address of the fourth communication port is described, to the information processing apparatus via the second communication device.

9. The power supply controlling system according to claim 8, wherein
the expansion device further including:
a first judgment portion that judges whether there is an abnormality on a first communication route connected to the information processing apparatus via the first communication device based on whether a returned mail has been received from the information processing apparatus within a given time period; and
the power supply controlling apparatus further including:
a second judgment portion that judges whether there is an abnormality on a second communication route connected to the information processing apparatus via the second communication device based on whether a returned mail has been received from the information processing apparatus within a given time period; and
a reboot portion that reboots the first communication device when the abnormality on the first communication route is notified from the first judgment portion, and reboots the second communication device when the second judgment portion judges that the second communication route is abnormal.

10. The power supply controlling system according to claim 9, wherein
the expansion device further including:
a first notification portion that notifies the information processing apparatus of the abnormality on the first communication route via the second communication route when the first judgment portion judges that there is the abnormality on the first communication route; and
the power supply controlling apparatus further including:
a second notification portion that notifies the information processing apparatus of the abnormality on the second communication route via the first communication route when the second judgment portion judges that there is the abnormality on the second communication route;
wherein the reboot portion reboots the first communication device when the reboot of the first communication device as a response of the notification by the first notification portion is instructed from the information processing apparatus via the second communication device, and the reboot portion reboots the second communication device when the reboot of the second communication device as a response of the notification by the second notification portion is instructed from the information processing apparatus via the expansion device.

11. A non-transitory computer readable recording medium causing a power supply controlling apparatus to execute a process, the power supply controlling apparatus including a plurality of communication ports, each of which is configured to be connected to an information processing apparatus via a different corresponding communication device, respectively, and configured to be connected to a data input and output device, the process comprising:
switching a setting of at least one of the communication ports so as to connect the at least one of the communication ports to either one of the data input and output device and the corresponding communication device; and
transmitting an e-mail in which an address of the communication port is described, to the information processing apparatus via the corresponding communication device connected to the communication port when the setting of the communication port is switched so as to connect the communication port to the corresponding communication device, and the communication devices are connected to the communication ports, respectively.

12. A communication device that is capable of communicating with an information processing apparatus connectable to the communicating device, the communicating device comprising:

communication ports each of which is connectable to the same information processing apparatus via a different corresponding communication device, respectively, and at least one of the communication ports is also connectable to a data input and output device;

a switching portion that switches a setting of the communication port so as to connect the communication port to either of the data input and output device and the corresponding communication device; and a transmission portion that, when the switching portion switches the setting of the communication port as to connect the communication port to the corresponding communication device, transmits and e-mail describing an address of the communication port in which its setting has been switched to the information processing apparatus.

13. The communicating device according to claim 12, wherein the transmission portion transmits the e-mail to the information processing apparatus via the communication device connected to the communication port in which the setting is switched.

14. The communicating device according to claim 12, further comprising:

a judgment portion that judges whether any abnormality exist on any of the communication routes connected to the information processing apparatus based on whether a returned mail has been received from the information processing apparatus though the communication route; and a reboot portion that when the judgment portion judges that there is an abnormality on any communication route, reboots the communication device provided on the communication route with the abnormality.

15. The communicating device according to claim 12, wherein, whenever the address of the communication port is decided or changed, the transmission portion transmits the e-mail in which the decided or changed address of the communication port is described to the information processing apparatus via the corresponding communication device connected to the communication port in which the address is decided or changed.

* * * * *

UNITED STATES PATENT AND TRADEMARK OFFICE
CERTIFICATE OF CORRECTION

| | |
|---|---|
| PATENT NO. | : 9,218,036 B2 |
| APPLICATION NO. | : 12/929534 |
| DATED | : December 22, 2015 |
| INVENTOR(S) | : Naoyuki Nagao |

It is certified that error appears in the above-identified patent and that said Letters Patent is hereby corrected as shown below:

Title Page
Insert --(30) Foreign Application Priority Data
Feb. 2, 2010   (JP)..........................2010-021637--.

Signed and Sealed this
Seventeenth Day of May, 2016

Michelle K. Lee
*Director of the United States Patent and Trademark Office*